(12) United States Patent
Kim

(10) Patent No.: US 8,107,027 B2
(45) Date of Patent: Jan. 31, 2012

(54) LIQUID CRYSTAL DISPLAY

(75) Inventor: Dong-Gyu Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 12/554,349

(22) Filed: Sep. 4, 2009

(65) Prior Publication Data
US 2010/0177257 A1 Jul. 15, 2010

(30) Foreign Application Priority Data

Jan. 14, 2009 (KR) .................... 10-2009-0003002

(51) Int. Cl.
*G02F 1/1343* (2006.01)
*G02F 1/136* (2006.01)
*H01L 29/10* (2006.01)
*H01L 29/04* (2006.01)
(52) U.S. Cl. ............... 349/43; 349/39; 257/59
(58) Field of Classification Search ............... 349/38, 349/39, 42, 43; 257/59, 72
See application file for complete search history.

(56) References Cited

U.S. PATENT DOCUMENTS

| | | | |
|---|---|---|---|
| 6,259,494 B1 * | 7/2001 | Kawai et al. | 349/39 |
| 2006/0061700 A1 * | 3/2006 | Chung et al. | 349/38 |
| 2006/0152655 A1 * | 7/2006 | Kim | 349/110 |
| 2008/0018815 A1 * | 1/2008 | Choi et al. | 349/37 |
| 2008/0129670 A1 | 6/2008 | Ma | |
| 2010/0128201 A1 * | 5/2010 | Lee | 349/62 |

FOREIGN PATENT DOCUMENTS

| | | |
|---|---|---|
| JP | 11167127 | 6/1999 |
| KR | 1020080009403 | 1/2008 |
| KR | 1020080009897 | 1/2008 |
| KR | 1020080038538 | 5/2008 |
| KR | 1020080046041 | 5/2008 |
| KR | 1020080046042 | 5/2008 |
| KR | 1020080051852 | 6/2008 |
| KR | 1020080060889 | 7/2008 |

* cited by examiner

*Primary Examiner* — Mark Robinson
*Assistant Examiner* — Michael Inadomi
(74) *Attorney, Agent, or Firm* — H.C. Park & Associates, PLC

(57) ABSTRACT

The present invention relates to a liquid crystal display that includes a substrate, gate lines formed on the substrate, storage electrode lines extending in the same direction as the gate lines, and data lines intersecting the gate lines. Pixel electrodes can be connected to the thin film transistors and can be arranged in a matrix. The pixel electrodes can include a first edge parallel to the gate lines and a second edge with a second length shorter than a first length of the first edge. The second edge can be parallel to the data lines. When a first pixel electrode and a second pixel electrode are disposed on two sides of a storage electrode line, one of the first edge of the first pixel electrode and the first edge of the second pixel electrode may overlap the storage electrode line.

14 Claims, 3 Drawing Sheets

LIQUID CRYSTAL DISPLAY

CROSS REFERENCE TO RELATED APPLICATION

This application claims priority from and the benefit of Korean Patent Application No. 10-2009-0003002, filed on Jan. 14, 2009, which is hereby incorporated by reference for all purposes as if fully set forth herein.

BACKGROUND OF THE INVENTION

1. Field of the Invention

Embodiments of the present invention relate to a liquid crystal display.

2. Description of the Background

A liquid crystal display (LCD) is one of the most widely-used flat panel displays, and is composed of two display panels on which field generating electrodes such as pixel electrodes and a common electrode are formed. A liquid crystal layer may be interposed between the two display panels. In the LCD, voltages are applied to the field generating electrodes to generate an electric field in the liquid crystal layer. Subsequently, alignment of liquid crystal molecules of the liquid crystal layer may be determined by the electric field. Accordingly, the polarization of incident light may be controlled and an image may be displayed.

The LCD also includes switching elements connected to the respective pixel electrodes and a plurality of signal lines, such as gate lines and data lines, for controlling the switching elements and applying voltages to the pixel electrodes. The gate lines transmit gate signals generated through a gate driving circuit, the data lines transmit data voltages generated through a data driving circuit, and the switching elements transmit the data voltage to the pixel electrodes according to the gate signals.

Gate driving and data driving circuits are directly mounted on the display panel using a plurality of IC chips, or are mounted on a flexible circuit film and attached to the display panel; however, the IC chips occupy a large portion of the manufacturing cost of the LCD. Therefore, for LCDs with high resolution and a large size, it is desirable to reduce the number of data driver ICs since the price of data driver ICs is higher than that of the gate driving circuit. The gate driving circuit may be integrated in the display panel along with the gate lines, the data lines, and the switching element such that the cost of an LCD may be reduced; however, the data driving circuit can have a complicated structure such that it is difficult to integrate the data driver IC in the display panel. As a result, it is further necessary to reduce the number of data driver ICs.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide reducing the number of data driving circuit installed in a liquid crystal display, and increasing the aperture ratio thereof.

Additional features of the invention will be set forth in the description which follows, and in part will be apparent from the description, or may be learned by practice of the invention.

Exemplary embodiments of the present invention disclose a liquid crystal display comprising a first substrate, a plurality of gate lines formed on the first substrate and extending in a first direction, a plurality of storage electrode lines extending in the first direction, and a plurality of data lines intersecting the plurality of gate lines. The liquid crystal display further comprises a plurality of thin film transistors connected to the plurality of gate lines and the plurality of data lines. The liquid crystal display further comprises a plurality of pixel electrodes respectively connected to the plurality of thin film transistors and arranged in a matrix. Each of the plurality of pixel electrodes comprises a first edge parallel to the plurality of gate lines and a second edge having a second length shorter than a first length of the first edge. The second edge is parallel to the data lines. When a first pixel electrode and a second pixel electrode of the plurality of pixel electrodes are disposed on two sides of a storage electrode line, one of the first edge of the first pixel electrode and the first edge of the second pixel electrode overlaps the storage electrode line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
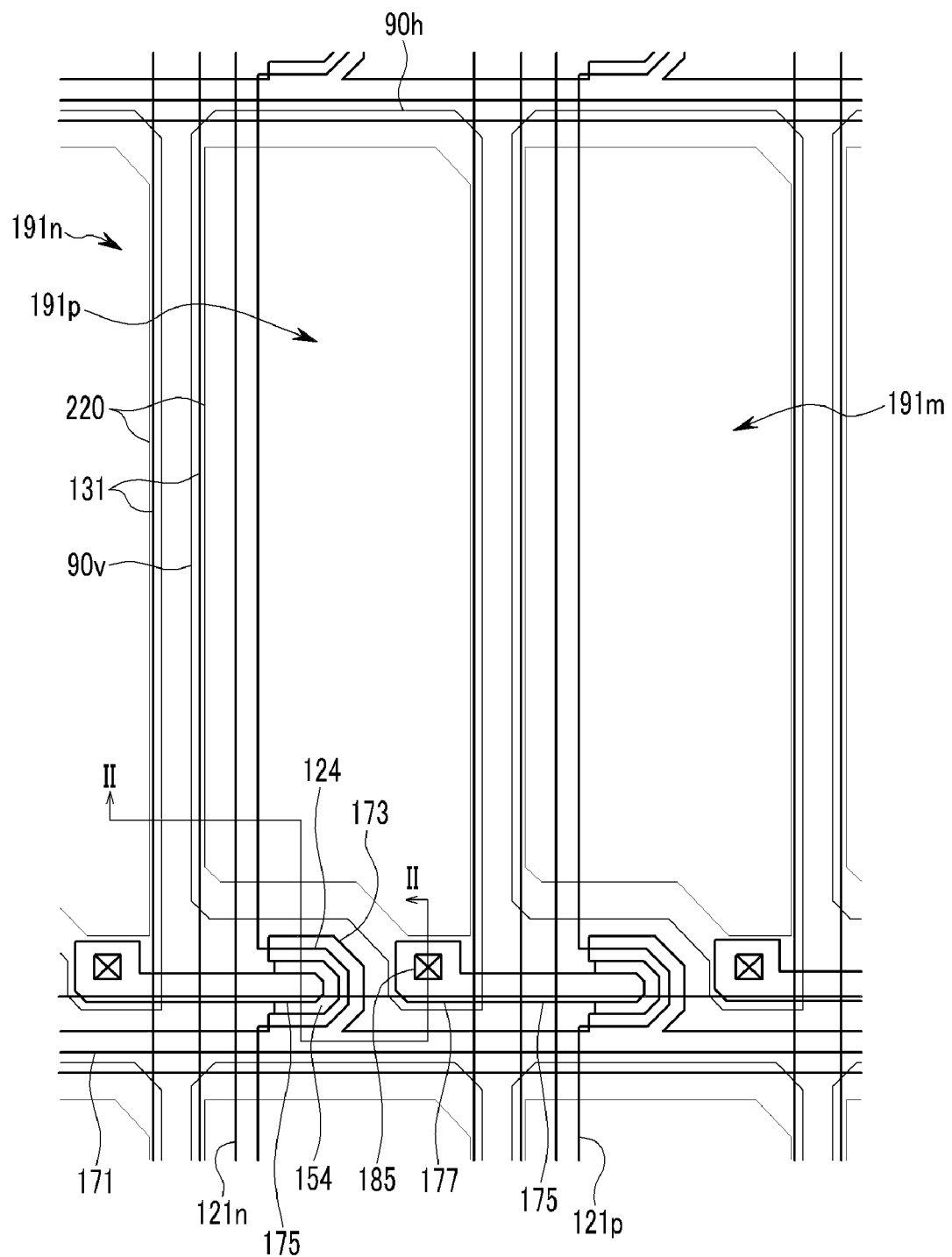
FIG. 1 is a layout view of a liquid crystal display according to an exemplary embodiment of the present invention.

Embodiments of the present invention are described more fully hereinafter with reference to the accompanying drawings in which exemplary embodiments of the invention are illustrated. Embodiments of the invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions may be exaggerated for clarity. Detailed descriptions of well-known functions and structures incorporated herein may be omitted to avoid obscuring the subject matter of the embodiments. Like reference numerals in the drawings denote like elements.

It will be understood that when a first element or layer is referred to as being "on," "connected to" or "coupled to" another element(s) or layer(s), the first element or layer can be directly on, connected to, or coupled to the other element or layer(s) and/or intervening elements or layers may be present. In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments and is not intended to be limiting of the present invention. As used herein, the singular forms "a," "an" and "the" can include the plural forms as well, unless the context clearly indicates otherwise. It will be further understood that the terms "comprises" and/or "comprising," when used in this specification, can specify the presence of stated features, integers, steps, operations, elements, and/or components, but do not necessarily preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result of, for example, manufacturing techniques and/or tolerances, are to be expected. Thus, example embodiments of the present invention should not be construed as limited to the particular shapes of regions illustrated herein but can include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
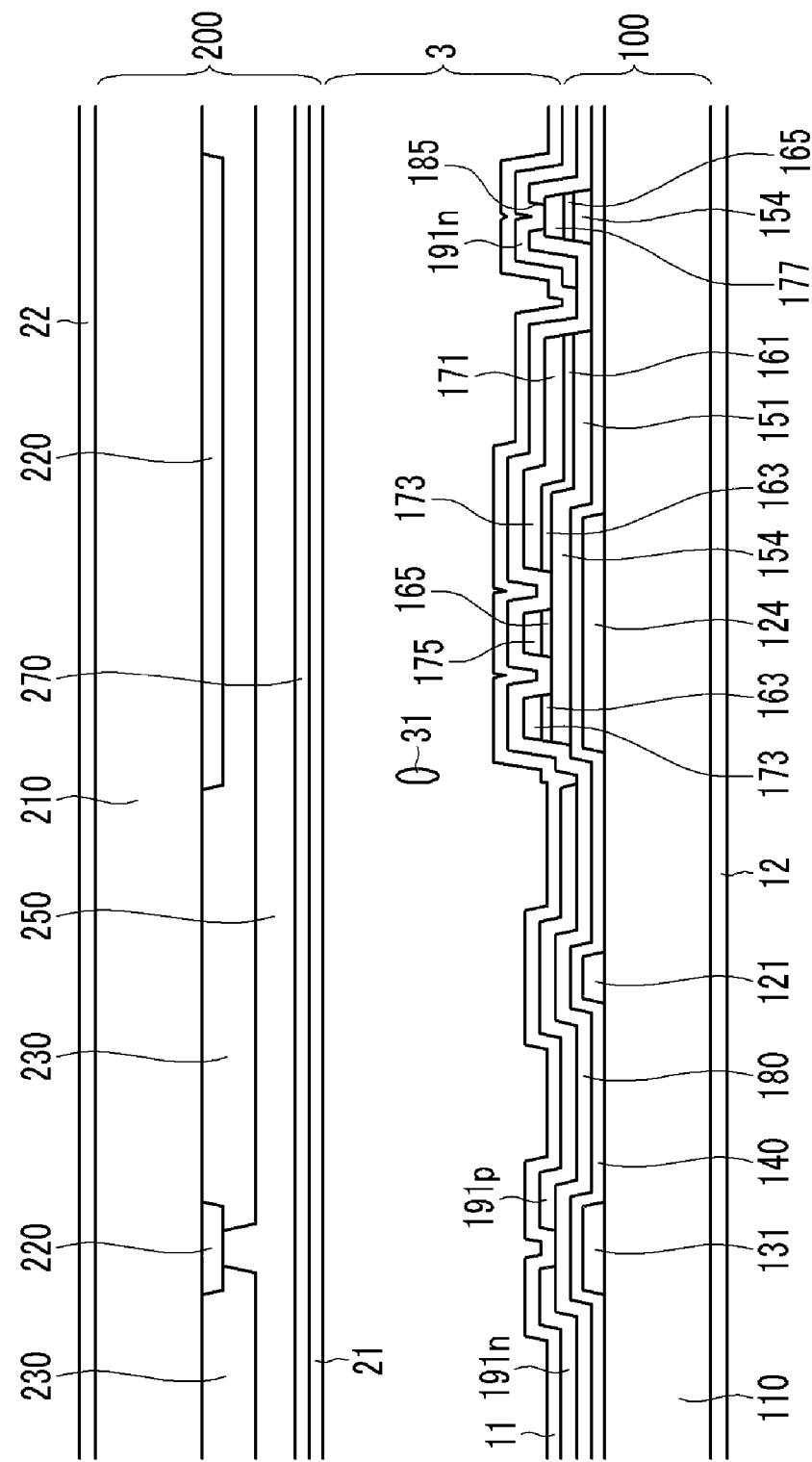
FIG. 2 is a cross-sectional view taken along line II-II shown in FIG. 1.

FIG. 1 is a layout view of a liquid crystal display according to exemplary embodiments of the present invention. FIG. 2 is a cross-sectional view taken along line II-II shown in FIG. 1, and FIG. 3 is an equivalent circuit diagram of the liquid crystal display shown in FIG. 1.

Figure 3:
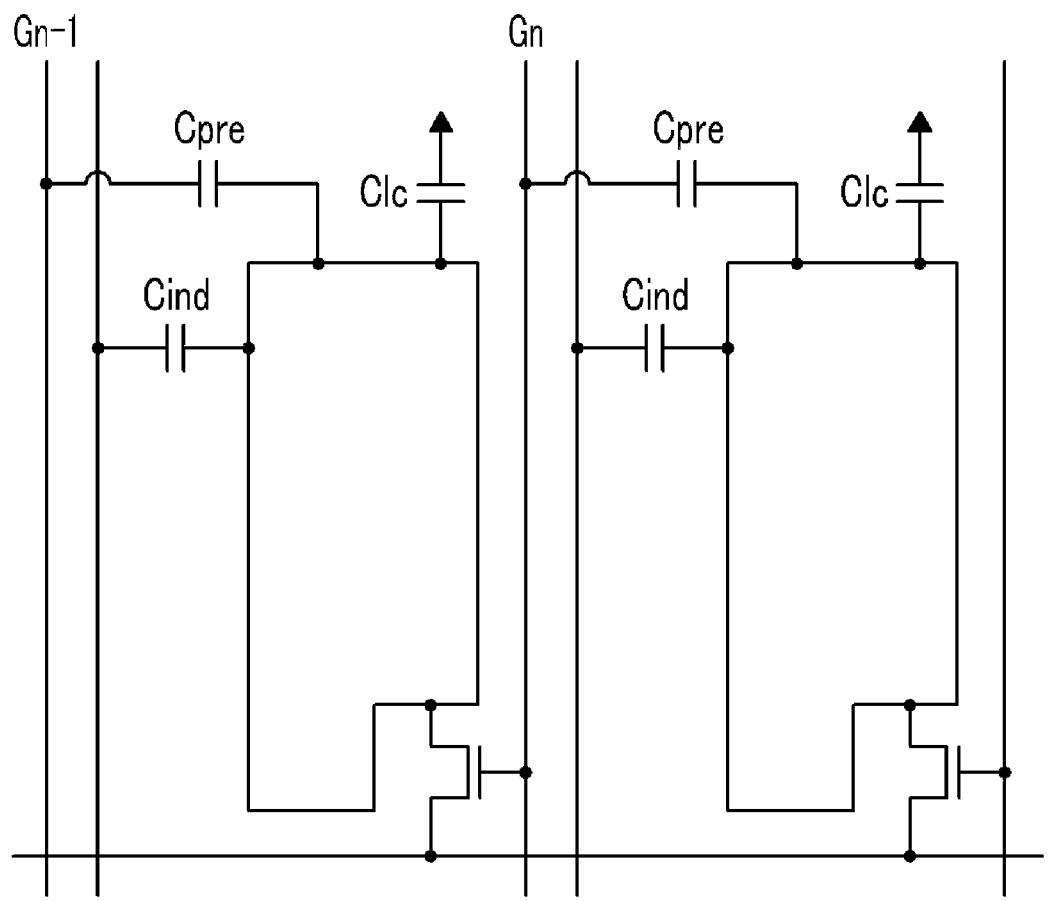
FIG. 3 is an equivalent circuit diagram of the liquid crystal display shown in FIG.

Referring to FIG. 1, FIG. 2, and FIG. 3, a thin film transistor (TFT) array panel 100 and a common electrode panel 200 may face each other. A liquid crystal layer 3 may be interposed between the two display panels 100 and 200.

In the TFT array panel 100, a plurality of gate lines 121n, 121p and a plurality of storage electrode lines 131 may be formed on an insulating substrate 110 made of transparent glass or plastic. The insulating substrate 110 may have a longer length in the transverse direction than in the longitudinal direction.

The gate lines 121n, 121p may transmit gate signals and may primarily extend in the longitudinal direction. Each of the gate lines 121n, 121p may include a plurality of gate electrodes 124 protruding to the left or right, and an end portion (not shown) having a large area for connection with another layer or an external driving circuit (not shown).

The storage electrode lines 131 may extend parallel to the gate lines 121n, 121p, and may be supplied with a predetermined voltage such as a common voltage Vcom. The storage electrode line 131 may include a storage electrode (not shown) connected to the storage electrode line 131. In general, various configurations and shapes of the gate lines 121n, 121p, storage electrode line 131, and storage electrode may be used.

The gate lines 121n, 121p and the storage electrode lines 131 may be made of an aluminum-based metal of aluminum (Al) or aluminum alloys, a silver-based metal of silver (Ag) or silver alloys, a copper-based metal of copper (Cu) or copper alloys, a molybdenum-based metal of molybdenum (Mo) or molybdenum alloys, chromium (Cr), tantalum (Ta), and/or titanium (Ti). Also, the gate lines 121n, 121p and the storage electrode lines 131 may have a multi-layered structure including one conductive film made of a metal having low resistivity in order to reduce signal delay or voltage drop, and another conductive film made of a material having good physical, chemical, and electrical contact characteristics.

A gate insulating layer 140 may be made of silicon nitride (SiNx) or silicon oxide (SiOx) and may be formed on the gate lines 121n, 121p and the storage electrode lines 131.

A plurality of semiconductor stripes 151 that are made of hydrogenated amorphous silicon (a-Si is an abbreviation for amorphous silicon) or polysilicon may be formed on the gate insulating layer 140. The semiconductor stripes 151 may include a plurality of projections 154 that may extend toward the gate electrodes 124 and may overlap the gate electrode 124.

A plurality of ohmic contact stripes 161 and a plurality of ohmic contact islands 165 may be formed on the semiconductor stripes 151. The ohmic contact stripes 161 and the ohmic contact islands 165 may be made of a material such as silicide or n+ hydrogenated amorphous silicon in which an n-type impurity such as phosphor may be doped with a high density. The ohmic contact stripes 161 may include a plurality of projections 163, and the projections 163 and the ohmic contact islands 165 may be disposed as pairs on the projections 154 of the semiconductor stripes 151.

The sides of the semiconductor stripes 151 and the sides of the ohmic contact stripes and islands 161 and 165 may be sloped at an angle of approximately 30° to 80° relative to the surface of the substrate 110.

A plurality of data lines 171 and a plurality of data electrodes 175 may be formed on the ohmic contact stripes and islands 161 and 165 and the gate insulation layer 140.

The data lines 171 may transfer data signals and may primarily extend in a transverse direction, thereby intersecting the gate lines 121n, 121p. Each data line 171 may include a plurality of source electrodes 173 extending toward the gate electrodes 124, and an end portion (not shown) with a wide area for connection with a different layer or an external driving circuit. A data line and semiconductor excepting a channel of a TFT may have the same plane shape. A data driving circuit (not shown) for generating a data signal can be mounted on a flexible printed circuit film (not shown) attached to the substrate 110. Alternatively, the data driving circuit may be mounted directly on the substrate 110 or integrated with the substrate 110. In the case where the data driving circuit is integrated with the substrate 110, the data lines 171 may be elongated to be connected therewith. It should be understood that various configurations and suitable alterations of the data driving circuit may be used.

The drain electrodes 175 may be separated from the data lines 171 and may face the source electrodes 173 with respect to the gate electrodes 124. Each drain electrode 175 may include one end portion 177 that is large and one end portion that may have a bar shape. The bar-shaped end portion may be partially surrounded by a source electrode 173 that may be shaped as a "U". The large end portion 177 may cross the gate line 121$n$, 121$p$ and the storage electrode line 131 and may be disposed at the opposite side to the bar-shaped end portion with respect to the gate line 121$n$, 121$p$.

A TFT may include a gate electrode 124, a source electrode 173, and a drain electrode 175. A TFT may also include the protrusion 154 of the semiconductor stripe 151 and a channel of the TFT formed at the protrusion 154 between the source electrode 173 and the drain electrode 175.

The drain lines 171 and the drain electrodes 175 may be made of a refractory metal, such as molybdenum, chromium, tantalum, and titanium, or their alloys, and can have a multi-layer structure including a refractory metal film (not shown) and a low-resistance conductive layer (not shown). The sides of the data lines 171 and the sides of the drain electrodes 175 may be sloped at an angle of about 30° to 80° relative to the surface of the substrate 110.

The ohmic contact stripes and islands 161 and 165 may exist between underlying semiconductor stripes 151 and overlying data lines 171 and drain electrodes 175 to lower contact resistance therebetween. Some portions of each semiconductor stripe 151, including, for example, a portion between the source electrode 173 and the drain electrode 175, may be exposed without being covered by the data line 171 and the drain electrode 175.

The ohmic contacts 161, 163, and 165, and the data lines 171 and 175 may have substantially the same planar shape. The ohmic contacts 161, 163, and 165 may have substantially the same planar shape as the semiconductor islands 151 except for the exposed portion of the projections 154 thereof.

A passivation layer 180 may be formed on the data lines 171, the drain electrodes 175, and the exposed portions 154 of the semiconductor stripes 151. In some cases, the passivation layer 180 may be made of an inorganic insulator such as silicon nitride and silicon oxide. In some cases, the passivation layer 180 may be made of an organic insulator and may have a planarized surface. The organic insulator can have photosensitivity and a dielectric constant that is not greater than about 4.0. Also, the passivation layer 180 may have a dual-layered structure including a lower inorganic layer and an upper organic layer. The dual-layered structure may prevent the exposed portion of the semiconductor stripe 151 from being damaged while still sustaining the excellent insulation characteristics of the organic layer.

The passivation layer 180 may have a plurality of contact holes 185 exposing the drain electrodes 175.

A plurality of pixel electrodes 191 may be arranged in a matrix and may be formed on the passivation layer 180.

Each pixel electrode 191$n$, 191$p$, 191$m$ may have four main edges parallel to the gate lines 121$n$, 121$p$ or the data lines 171. A length of two longitudinal edges 90$v$ parallel to the gate lines 121$n$, 121$p$ may be about three times longer than a length of two transverse edges 90$h$ parallel to the data lines 171. Accordingly, the number of pixel electrodes 191$n$, 191$p$, 191$m$ arranged in the row direction may be larger than the number of pixel electrodes 191 arranged in the column direction.

When the data lines 171 are formed in the transverse direction and the gate lines 121$n$, 121$p$ are formed in the longitudinal direction, the number of gate lines 121$n$, 121$p$ may be increased and the entire number of data lines 171 may be decreased such that the number of data driver IC chips may be reduced, thereby reducing the overall cost. If the number of gate lines 121$n$, 121$p$ is increased, the gate drivers may be integrated with the substrate 110 along with the gate lines 121$n$, 121$p$, the data lines 171, and the TFTs, such that a problem due to the increasing of the number of gate lines 121$n$, 121$p$ is not generated. Also, although the gate driver may be installed as an IC chip, a price of the gate driver IC chip is relatively low such that it is advantageous to reduce the number of data driver IC chips compared to gate driver IC chips.

Also, adjacent portions between the pixel electrodes 191$n$, 191$p$, 191$m$ and the data lines 171 may be shortened compared to the conventional structure in which the pixel electrodes 191 may have longer edges in the direction of the data lines 171. The shortening may reduce the parasitic capacitance between the pixel electrodes 191$n$, 191$p$, 191$m$ and the data lines 171. An organic insulating material that has a low dielectric constant may be used as the passivation layer against the parasitic capacitance between the pixel electrodes 191$n$, 191$p$, 191$m$ and the data lines 171. Although an inorganic layer may be used as the passivation layer, an influence of the parasitic capacitance may be minimized in exemplary embodiments of the present invention.

The pixel electrodes 191$n$, 191$p$, 191$m$ may be connected to the drain electrodes 175 through the contact holes 185 to receive data voltages from the drain electrodes 175. A data voltage may be applied to pixel electrodes 191$n$, 191$p$, 191$m$ and a common voltage may be applied to a common electrode 270 of the common electrode panel 200 thereby resulting in an electric field that may determine a direction of liquid crystal molecules of a liquid crystal layer 3 between the two electrodes. A polarization of light passing through the liquid crystal layer may be changed according to a direction of the liquid crystal molecules. As the pixel electrodes 191$n$, 191$p$, 191$m$ and the common electrode form a capacitor (hereinafter referred to as a "liquid crystal capacitor"), an applied voltage may be sustained even after a TFT is turned off.

The storage electrode lines 131 may be disposed between two neighboring pixel electrodes 191$n$, 191$p$, 191$m$. Longitudinal edges 90$v$ of the pixel electrodes 191$n$, 191$p$, 191$m$ may be disposed on the storage electrode lines 131. Accordingly, the longitudinal edges of two neighboring pixel electrodes 191$n$, 191$p$, 191$m$ may be disposed together on the storage electrode lines 131. An overlapping width of an edge of the pixel electrode 191$n$, 191$p$, 191$m$ and the storage electrode line 131 (i.e., distance from the longitudinal edge 90$v$ of the pixel electrode 191$n$, 191$p$, 191$m$ to a boundary of the storage electrode line) is preferably less than 3 μm. The pixel electrode 191$n$, 191$p$, 191$m$ and the storage electrode line 131 may overlap each other and may form a storage capacitor enhancing a capacity for maintaining the voltage of the liquid crystal capacitor.

A gate line 121$p$ may be connected to the gate electrode 124 of TFT Qp, which may be connected to a first pixel electrode 191$p$ disposed on the right side among two neighboring pixel electrodes 191*n* and 191*p*. The gate line 121*p* may not overlap the first pixel electrode 191*p*, but may overlap the second pixel electrode 191*n* that is disposed on the left side of the two neighboring pixel electrodes 191*n* and 191*p*. Gate line 121*n* may be connected to the gate electrode 124 of the TFT Qn, which may be connected to the right pixel electrode 191*n*. The gate line 121*n* may overlap the third pixel electrode 191*m* neighboring the right side of the first pixel electrode 191*n*.

In some cases, a storage electrode line 131 overlapping the edge of the pixel electrode 191 may be formed between pixel electrodes neighboring in the row direction. The storage electrode line 131 may overlap the gate line 121*p*. In such cases, a width of the storage electrode line 131 may be decreased, but sufficient storage capacitance may be obtained and the aperture ratio may be increased.

That is, in some exemplary embodiments of the present invention, the storage capacitance Cst of one pixel may be formed as a sum of a main storage capacitance formed between the pixel electrode 191 and the storage electrode line 131, and the assistance storage capacitance formed between the gate line 121 and the pixel electrode. Accordingly, if a conventional storage capacitance is required, the main storage capacitance may be decreased by the assistance storage capacitance such that the width of the storage electrode line 131 is reduced when forming the main storage capacitance.

The influence of parasite capacitance due to a previous gate line 121*n* for the assistance storage capacitance may be obtained through Equation 1. The main storage capacitance and the assistance storage capacitance of the corresponding pixel electrode 191*p* may be coupled in series such that an increased amount of the parasitic capacitance due to the previous gate line is minimal and inconsequential. In some cases, the previous gate line may intersect a pixel electrode.

$$C_{GATE} = C_{CROSS} + C_{GD} + (C_{PRE} * (C_{GS} + C_{LC} + C_{IND}) / (C_{PRE} + (C_{GS} + C_{LC} + C_{IND}))$$  Equation 1

In Equation 1, Ccross may be a parasitic capacitance generated at a portion where the gate line and the data line cross; Cgd may be a parasitic capacitance generated between the gate line and the drain electrode; Cpre may be a parasitic capacitance generated between the previous gate line and the pixel electrode; Cgs may be a parasitic capacitance generated between the gate line and the source electrode; Clc may be a capacitance of the liquid crystal layer generated between the pixel electrode and the common electrode; and Cst may be a main capacitance generated between the storage electrode line and the pixel electrode.

A kickback voltage may be generated due to a parasitic capacitance generated between the gate line 121*n* and the pixel electrode 191*p*, and a kickback voltage deviation may be generated proportional to the overlapping area between the gate line 121*n* and the pixel electrode 191*p*. However, in exemplary embodiments of the present invention, the gate line 121*n* may intersect the pixel electrode 191*p* and may be covered by the pixel electrode 191*p* such that the kickback voltage deviation generated between the pixel electrode 191*p* and the gate line 121*n* may be reduced.

Next, the common electrode panel 200 will be described.

A light blocking member 220 may be formed on an insulation substrate 210 made of, for example, transparent glass. In general, various suitable materials may be used to form the insulation substrate. The light blocking member 220 is also referred to as a black matrix and prevents light leakage. The light blocking member 220 may include a linear portion formed according to the storage electrode line 131 and the data line 171, and a surface portion corresponding to the TFT.

According to some exemplary embodiments, the longitudinal edge 90*v* of the pixel electrode 191*n*, 191*p*, 191*m* may be disposed on the storage electrode line 131. The liquid crystal molecules may be disposed between the gate line 121*n*, 121*p* and the storage electrode line 131 and may be arranged by the electric field generated between the pixel electrode 191*n*, 191*p*, 191*m* and the common electrode 131, thereby reducing the light leakage between the gate line 121*n*, 121*p* and the storage electrode line 131.

Accordingly, the light blocking member may be formed with almost the same width as the storage electrode line 131, thereby increasing the aperture ratio. For example, conventionally, the width of the light blocking member 220 is increased to cover the portion between the storage electrode line 131 and the gate line 121*n*, 121*p*; however, according to exemplary embodiments of the present invention, it is not necessary to cover the portion between the storage electrode line 131 and the gate line 121*n*, 121*p* to reduce the width of the storage electrode line 131 of the light blocking member 220.

In the conventional art, if the width of the storage electrode line is 12 µm, the storage electrode line can be disposed on the right and left sides with respect to the gate line; the distance between the storage electrode line and the gate line is 7 µm; and the width of the light blocking member is about 26 µm.

However, according to exemplary embodiments of the present invention, if the width of the storage electrode line 131 is 12 µm, there is no light leakage between the storage electrode line 131 and the gate line 121*n*, 121*p*, and the width of the light blocking member 220 may be about 12 µm, thereby increasing the aperture ratio.

A plurality of color filters 230 may be formed on the substrate 210 and the light blocking member 220. The color filters 230 may primarily be positioned inside a region surrounding the light blocking member 220, and may extend along the column of the pixel electrodes 191. Each color filter 230 may display one of the primary colors (i.e., red, green, or blue).

An overcoat 250 may be formed on the color filters 230 and the light blocking members 220. The overcoat 250 may be made of an (organic) insulator, may prevent the color filters 230 from being exposed, and may provide a planarized surface. In some cases, the overcoat 250 may be omitted.

Alignment layers 11 and 21 may respectively be coated on each of the inner surfaces of the two display panels 100 and 200. In some cases, the alignment layers 11 and 21 may be vertical alignment layers. Polarizers 12 and 22 may be attached to each of the outer surfaces of the two display panels 100 and 200. Transmissive axes of the two polarizers 12 and 22 may be perpendicular or parallel to each other. In the case of a reflective LCD, one of the two polarizers 12 and 22 can be omitted.

The liquid crystal display according to the present exemplary embodiment may include a phase retardation film (not shown) for compensating delay of the liquid crystal layer 3. The LCD may include a backlight unit (not shown) for providing light to the polarizers 12 and 22, the phase retardation film, the display panels 100 and 200, and the liquid crystal layer 3.

The liquid crystal layer 3 may have negative or positive dielectric anisotropy. Liquid crystal molecules 31 of the liquid crystal layer 3 may be arranged such that a longitudinal axis of the liquid crystal molecules 31 is perpendicular or parallel to the surfaces of the two panels if an electric field does not exist.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a first substrate;
    a plurality of gate lines formed on the first substrate and extending in a first direction;
    a plurality of storage electrode lines extending in the first direction;
    a plurality of data lines intersecting the gate lines;
    a plurality of thin film transistors connected to the gate lines and the data lines; and
    a plurality of pixel electrodes respectively connected to the thin film transistors and arranged in a matrix, each pixel electrode comprising:
        a first edge parallel to the gate lines, the first edge having a first length; and
        a second edge having a second length shorter than the first length of the first edge, the second edge being parallel to the data lines,
    wherein a first pixel electrode and a second pixel electrode of the pixel electrodes are disposed on two sides of a storage electrode line, and one of the first edge of the first pixel electrode and the first edge of the second pixel electrode overlap the storage electrode line,
    wherein each transistor of the plurality of thin film transistors comprises:
        a gate electrode extending from a first gate line;
        a semiconductor overlapping the gate electrode;
        a source electrode overlapping the semiconductor and extending from a first data line; and
        a drain electrode facing the source electrode and overlapping the semiconductor,
    wherein the drain electrode intersects the storage electrode line and the first gate line, and
    wherein the drain electrode comprises a first portion connected to the pixel electrode and a second portion facing the source electrode, the first portion being disposed on a first side of the first gate line and the storage electrode line and the second portion being disposed on a second side of the first gate line and the storage electrode line, the first side being on an opposite side of the first gate line and the storage electrode line as the second side.

2. The liquid crystal display of claim 1, wherein
    the first edge extends in a column direction and the second edge extends in a row direction, and
    a number of the pixel electrodes disposed in a row is larger than a number of pixel electrodes disposed in a column.

3. The liquid crystal display of claim 2, wherein
    the pixel electrodes overlap previous gate lines.

4. The liquid crystal display of claim 3, wherein
    the previous gate lines are disposed at positions intersecting the pixel electrodes.

5. The liquid crystal display of claim 4, wherein
    a leftmost pixel electrode among two pixel electrodes neighboring in the row direction covers a gate line connected to a leftmost thin film transistor among two thin film transistors neighboring in the row direction, the leftmost pixel electrode being connected to a rightmost thin film transistor among the two thin film transistors neighboring in the row direction.

6. The liquid crystal display of claim 1, wherein
    the pixel electrodes overlap previous gate lines.

7. The liquid crystal display of claim 6, wherein
    the previous gate lines are disposed at positions intersecting the pixel electrodes.

8. The liquid crystal display of claim 1, wherein
    a length of the first edge is three times a length of the second edge.

9. The liquid crystal display of claim 1, further comprising
    a gate driver connected to the gate lines,
    wherein the gate driver comprises elements formed with the same layer as the gate lines, the data lines, and the thin film transistors.

10. The liquid crystal display of claim 1, wherein
    a distance between a boundary of the storage electrode line and the first edge is less than 3 μm.

11. The liquid crystal display of claim 1, further comprising
    a passivation layer disposed between at least one thin film transistor and at least one pixel electrode,
    wherein the passivation layer comprises an inorganic insulating layer.

12. The liquid crystal display of claim 1, wherein
    the data line and the semiconductor excepting a channel of the thin film transistor have the same plane shape.

13. The liquid crystal display of claim 1, further comprising:
    a second substrate facing the first substrate;
    a light blocking member disposed on the second substrate; and
    color filters disposed on the light blocking member,
    wherein the light blocking member comprises a linear portion corresponding to the storage electrode line.

14. The liquid crystal display of claim 13, wherein
    the light blocking member further comprises a surface portion corresponding to a first thin film transistor and a linear portion corresponding to a first data line.

* * * * *